United States Patent Office 3,007,864
Patented Nov. 7, 1961

3,007,864
DRILLING MUDS AND THE LIKE INCORPO-
RATING A TREATED SULFONATED LIGNIN
CONTAINING MATERIAL, AND PROCESS FOR
PRODUCING SAME
Carl Adolphson and Ellis Gray King, Bellingham, Wash.,
assignors to Puget Sound Pulp & Timber Co., Belling-
ham, Wash., a corporation of Delaware
No Drawing. Filed Nov. 6, 1957, Ser. No. 694,737
23 Claims. (Cl. 252—8.5)

Our invention and discovery relates to processes of treating spent sulfite liquor components, to products formed thereby, and to compositions utilizing same.

The said products are specially useful as additives to oil well drilling muds. Also, same are useful as dispersing agents, as for illustration and not limitation, in ceramics, cements, plasters, etc.

More specifically, our invention and discovery relates to a process for the preparation of drilling mud additives from sulfonated lignin containing material such as obtained from a bisulfite liquor process, which material preferably has been modified by concentration and preferably has part at least of its carbohydrates removed by fermentation treatment, and also the reaction product of such process which is the drilling mud or like additive contemplated by our invention and discovery.

Drilling fluids, called "muds" in the well drilling art, are necessary in the drilling of deep wells to reach deposits of fluids, such as petroleum, for example, especially when a rotary method of drilling is employed. Such drilling fluids or "muds" must meet certain requirements, as follows: They must act as liquid media of controlled viscosity for transporting cuttings from the borehole; they must function to partially seal off the borehole to prevent excessive amounts of the fluid from being lost by flowing from the borehole into surrounding formations by depositing on the wall of the hole a thin but substantially impervious filter cake; they must possess gel structures of sufficient strength to hold in suspension all solids, particularly during such time as the fluid is not circulating; they must serve as weighting materials exerting sufficient pressure to counter-balance any pressure exerted by tapped water, gas, oil or other fluids from a penetrated structure and to prevent caving or other intrusion into the drill hole.

In providing aqueous drilling muds, finely ground barytes, barium carbonate, iron oxid or lead sulfide have been employed to impart such necessary weight to the drilling fluid. To maintain these weighting materials in suspension in the fluid, it was found necessary to add considerable quantities of bentonite clay. But bentonite markedly increased the viscosity of the drilling fluid, so that excessive power was required to circulate the mud.

When water is used to decrease the viscosity of the mud, then such decrease affected the mud so that it was unable to hold in suspension well cuttings in the well when circulation of the drilling fluid was stopped.

Also, it was found, as depth of the drill hole increased and the hydrostatic pressure increased, excessively large amounts of water were forced into the surrounding formations. The thickness of the layer of plastering material deposited on the walls was roughly proportional to the water loss, i.e. both water and wall building materials were lost. These losses increased unduly the cost of well drilling operations.

Thus, the providing of a suitable drilling fluid involves a group of exacting factors which must not be self counteracting. It is a primary object of our invention to provide an additive derived from sulfonated lignin containing material such as obtained from spent sulfite liquor which meets these many requirements and provides less costly as well as better drilling fluids.

The primary and fundamental object of our invention is the providing of a new process for preparation of such new additive, both the process and product being of our invention and discovery, for drilling muds to be manufactured from sulfonated lignin such as found in spent sulfite liquor. Summarily stated, it is our object to provide an improved drilling fluid prepared by adding the modified sulfonated lignin containing reaction product of our invention to the other drilling fluid components, said drilling fluid after said addition being characterized by (a) features which overcome the above-mentioned disadvantages, (b) by having a low viscosity and yet possesses capacity to transport well cuttings from the well and at the same time permit the ready separation of said cuttings by their settling out upon reaching the surface of the ground, and (c) when so transporting the cuttings, by having the property of holding said cuttings in suspension in the well when circulation of the fluid has stopped for any reason during the drilling of the well.

Spent sulfite liquor is commercially derived from the treatment of wood in the form of chips in the production of cellulose pulp when said chips are digested with an aqueous solution of an acid bisulfite, such as calcium bisulfite or some alkali or other alkaline earth or ammonium bisulfite liquor at elevated temperatures under relatively high pressure. Under these conditions, the lignin which forms the sheaths for binding together the cellulose fibers of the wood is dissolved so that the cellulose is freed as a residue pulp. The lignin is extracted and is converted into a lignosulfonate salt (also known as lignin sulfonate or sulfonated lignin) and is a most complex product. Sulfonated lignin containing spent sulfite liquor is a very dilute solution and is a byproduct in the wash water from the cellulose in the pulping industries, and is readily available in large quantities for use as our starting material either directly or after pretreatment modification by fermentation and/or concentration, as desired.

Let is be emphasized that such production of sulfonated lignin containing spent sulfite liquor as a by-product in the cooking of wood to make pulp results in a liquor containing most complex compounds, the chemistry of which has not been fully determined even though extended studies have been made of the same over a period of many years. Exhaustive treatment of these complex compounds and known reactions thereof may be found in "The Chemistry of Lignin," by F. E. Brauns (1952), published by Academic Press, Inc., New York, New York, and in the two volume treatise "Wood Chemistry," by L. E. Wise (second edition, 1952), published by Reinhold Publishing Corporation, New York, New York.

Our process is directed to the treating of this complex spent sulfite liquor which consists of sulfonated lignin, carbohydrates, sulfites, water and miscellaneous other components. Spent sulfite liquor contains not only the lignin in the form of various lignosulfonates but also such carbohydrates as glucose, xylose, fructose, mannose, galactose, arabinose, sulfonated sugars; also calcium sulfite and calcium bisulfite, and also conidendrin, and other more or less volatile organic compounds. Due to the high temperatures and high pressures involved in cooking the wood chips to free the cellulose, but primarily due to the complex character of wood itself, the constituency of the spent sulfite liquor formed during the wood digesting and pulping operation is mainly highly complex chemical compounds. The relative proportions of these components vary with the wood species and with the cooking conditions.

In recent years in some plants sodium, magnesium or ammonium bisulfite has been used in lieu of calcium bisulfite to accomplish acid bisulfite delignification.

Our invention and discovery shows that reaction treatment of this character brings about an unexpected and remarkable change in the characteristics of the sulfonated lignin containing material markedly enhancing its effectiveness as an additive for drilling muds. By our process, useful products are produced which have not been heretofore obtained from spent sulfite liquor either unchanged or in its fermented and/or concentrated forms, except by use of other and different treatments which require complicated and expensive reactions and equipment as compared with those required by our process.

By way of summarization and illustration, our invention and discovery comprises the process and product formed by reacting a sulfonated lignin containing material in aqueous solution with a basic reagent having a hydroxyl ion concentration in the solution of at least pH 10, a sufficient amount of such basic reagent being used to establish and maintain the hydroxyl ion concentration of the reaction within the range of about pH 7 to about pH 10 without precipitation of the sulfonated lignin, maintaining the temperature of the reaction within the range of about 40° C. to about 120° C., and continuing the reaction until substantially no further drop in hydroxyl ion concentration occurs. Essentially, such basic reagent can also be categorized as selected from the group consisting of alkaline and alkaline earth metal hydroxides and salts having sufficient solubility and a predominant hydroxyl ion concentration in aqueous solution yielding a hydroxyl ion concentration at least about pH 10, and mixtures of such hydroxides and such salts.

In considering basic reagents within the scope of the present invention, it is well known that certain salts and mixtures of salts and bases give so-called "buffer solutions" which provide a predominant hydroxyl ion concentration of the order here involved, and will do so without precipitation of any of the sulfonated lignin. To illustrate, a salt such as sodium carbonate or sodium phosphate or a mixture either of these salts with sodium hydroxide in aqueous solution yields the pH necessary to bring about the disclosed reaction condition and effect. Using any such soluble or slightly soluble compound or mixture of compounds where the cation is selected from the group consisting of alkaline and alkaline earth metals and where the cation ion concentration (and related hydroxyl ion concentration in aqueous solution) is dominant compared with the anion ion concentration, the first effect on adding such to calcium base spent sulfite liquor, for example, is to cause a precipitate of calcium carbonate (selecting sodium carbonate as the basic reagent salt for illustration), with the formation of sodium lignosulfonate. As soon as all the calcium is precipitated, an additional sodium carbonate in appropriate quantity produces a hydroxyl ion predominance (i.e. an alkaline reaction condition) which then gives the reaction a pH between about pH 7 and about pH 10 as here required.

Thus, specific illustrations of basic reagents as are contemplated by and suitable for practice of our process are sodium hydroxide, potassium hydroxide, ammonium hydroxide, calcium hydroxide, magnesium hydroxide, strontium hydroxide, barium hydroxide, sodium carbonate, sodium acetate, sodium phosphate, sodium tetraborate, and mixtures thereof, for example.

It will be observed from the foregoing examples of the basic reagents contemplated by the present invention that ammonium hydroxide is operable and included according to recognized chemical terminology, the ammonium cation being considered in this context chemically the same as an identifiable as an alkaline metal cation.

The sulfonated lignin containing material which is employed as the starting material in practice of our invention and discovery can be any of the following:

(1) Spent sulfite liquor as it is received from the blow pit of the pulp manufacturing plant. The term "spent sulfite liquor" (also known as "waste sulfite liquor") as used herein is used to denote this starting material. In the case of spent sulfite liquor, of course, the sulfonated lignin is in very dilute condition so that large volumes of liquor must be handled, and this spent sulfite liquor contains excessive and deleterious amounts of sulfur dioxide which requires additional basic reagent or equivalent for neutralization, rendering such unmodified, spent sulfite liquor not the preferred form of starting material.

(2) Spent sulfite liquor which has been modified by fermentation pretreatment according to a fermentation process such as that disclosed in Joseph L. McCarthy Patent No. 2,430,355, issued November 4, 1947, and entitled "Production of Useful Products by Microorganisms Active Upon Prepared Sulfite Liquor." It will be understood that such fermentation process normally includes prior "stripping" and removes, for the most part, the fermentable carbohydrates (predominantly sugars) from the spent sulfite liquor.

(3) Spent sulfite liquor modified by concentration pretreatment to any practical degree, such as from about 20% to about 70% by weight and preferably about 50% by weight. For purposes of the present invention, it is to be noted that the technique known as "stripping" (passing steam through the solution) has the same function to a limited degree as concentration by evaporation because it serves to remove aldehydes, some volatile organic compounds, and loosely bound $SO_2$. As is also known, concentration pretreatment can be by either vacuum or high temperature evaporation.

(4) Spent sulfite liquor modified by both fermentation and concentration pretreatment, i.e. subjected to pretreatment according to both paragraphs 2 and 3 above.

Also, in considering the nature of possible starting materials for practice of our process and discovery, it is well known that removal of carbohydrates from the spent sulfite liquor can be accomplished by dialysis pretreatment while maintaining the liquid in solution form. However, this method of carbohydrate removal loses part of the sulfonated lignin and results in a very dilute solution thereof after pretreatment which is undesirable from a commercial point of view.

From the foregoing categorizations of various suitable starting materials for purpose of practice of the process of our invention and discovery, it will be seen that all such materials are "sulfonated lignin containing materials obtained from a bisulfite pulping process," irrespective of whether or not the spent sulfite liquor is subject to modification pretreatment such as fermentation and/or concentration. Accordingly, this term is used herein to generically denote such and equivalent starting materials. In considering the nature of possible equivalent starting materials, it is well to observe that extracted lignin is commercially available in other than sulfonated form, such as in the form produced by the Kraft process of pulp manufacture. Treating the lignins extracted by the Kraft process with the same pulping chemical (i.e. an acid bisulfite) at elevated temperature and pressure results in obtainment of a sulfonated lignin useful as the starting material in our process.

Also to be considered in connection with the nature of the above enumerated sulfonated lignin containing starting materials and the reaction product derived therefrom by the process of our invention is the fact that such starting materials contain a minor amount of sulfonated sugars which may also enter into reaction with the basic reagent. However, the dominant ingredient of these starting materials is the sulfonated lignin and any reactive effect on the sulfonated sugars incidentally present as may occur is merely an adjunct of and ancillary to the reaction and consequent improvement in the desired properties of the sulfonated lignin.

In considering the nature of our process and product and the treatment conditions involved, it is important to emphasize that the process proceeds to completion at elevated temperature under weakly alkaline reaction condition (about pH 7 to about pH 10) and that the sulfonated lignin is maintained in solution throughout the reaction. Certain basic reagents as here contemplated provide greater or lesser leeway as to the pH of the solution during reaction, consistent with the requirement that the sulfonated lignin be maintained in solution. Thus, should the basic reagent be sodium hydroxide, the pH of the reaction can be even as high as about pH 13 without any precipitation of sulfonated lignin occurring and the highest pH value during reaction would not necessarily be limited operability-wise to a maximum of about pH 10 but the final pH value nevertheless should be in the range of about pH 7 to about pH 10 because a somewhat better and less expensive product results. Such comparative lack of criticality as to operable maximum pH without sulfonated lignin precipitation during reaction in the instance of use of sodium hydroxide as a basic reagent is to be contrasted with less soluble basic reagents such as calcium hydroxide, for example, which has the property of precipitating the sulfonated lignins at a pH value of about 10.5 to 11. From this comparatively increased tendency to cause precipitation of sulfonated lignin, it will be evident that in using calcium hydroxide as the basic reagent it is essential to use only the amount necessary to give a pH in the requisite reaction range and maintain the sulfonated lignin in solution. Even around pH 10 in the reacting solution, use of calcium hydroxide as the basic reagent occasionally results in a small amount of organic material precipitating at first, but this minor precipitant is transitory in character and redissolves as the treatment is maintained and carried out to completion at a pH in the range of about 7 to about 10. The same is true when using magnesium hydroxide as the basic reagent since magnesium hydroxide is only slightly soluble in the solution and has a maximum pH capability of about 10.5.

While the preferred starting material for our process is sulfonated lignin as found in spent sulfite liquor subjected to fermentation and concentration pretreatment, the reaction treatment of the invention can be accomplished by adding the basic reagent directly to unconcentrated sulfonated lignin containing material either with or without fermentation pretreatment, as has been indicated. Should the starting material be in such unconcentrated form, after it has been heated to completion of the reaction as called for by our process, the reaction product can thereafter be concentrated, as by partial evaporation, to the degree deemed appropriate. Also, it is to be noted that the heating of the reaction can be interrupted, i.e. intermittent in character, with partial concentration of the intermediate reaction product, followed by further heating to a greater degree of concentration or even dryness at a later time or stage, as desired. Reaction treatment of unconcentrated spent sulfite liquor, i.e. without concentration pretreatment of the starting material, involves difficulties in connection with the development of scale in the evaporators and also has the disadvantage of requiring facilities having a comparatively large storage capacity. Of course, this latter disadvantage can be minimized by making the process continuous but still the processing of unconcentrated spent sulfite liquor as the starting material remains subject to the difficulties inherent in scaling because of dissolved and loosely combined $SO_2$.

The production and use of the reaction product of our process as a drilling mud additive is illustrated in the following examples, procedures, and results, given by way of illustration and not limitation:

EXAMPLE I

One hundred pounds of concentrated calcium base spent sulfite liquor derived from paper pulp production, having carbohydrates removed by fermentation and having an alkalinity value of about pH 4 and containing 47.5 pounds of dissolved solids per 100 pounds of solution, was placed in a container and heated to about 80° C., 7.36 pounds of sodium hydroxide solution (50% NaOH by weight) were added and the mixture was permitted to react at 80° C. with mild agitation for 20 hours. The pH was then 7.9. This solution was evaporated to dryness and the solid residue was ground to a brown powder. Such powder can be obtained as well by drum drying or spray drying.

This product was used to produce a drilling mud by the following procedure: (Let it be particularly noted that the following procedure in preparing the muds and in testing the effectiveness of the respective additives was used in ascertaining the data set forth in all examples.) 58.8 grams of a natural clay having a yield value of 35 barrels of 15 centipoises mud per ton of clay was stirred into 315 ml. of distilled water and mixed 2 minutes. Then 1 gram of the treated sulfonated lignin reaction product, prepared as above described, was added (equivalent to 1 pound per barrel of mud in practice) together with 20 grams of hydrated lime and 8 ml. of sodium hydroxide solution (1.00 ml. equals 0.25 gram of sodium hydroxide) and mixed 2 minutes. The mud viscosity determined by the standard American Petroleum Institute method with a Stormer viscometer at 600 r.p.m. was 5.9 centipoises as compared with 11.0 for the unreacted fermented sulfite liquor which constituted the control material and not treated according to our process. In addition, when the amount of the additive was increased to 3 grams (equivalent to 3 lbs. per bbl. in practice) the standard 10 minute gel strength was 8 as compared with 19 for the unreacted fermented spent sulfite liquor.

EXAMPLE II

One hundred pounds of concentrated, i.e. partially evaporated, fermented calcium base spent sulfite liquor of about pH 4 containing about 20 pounds of solids was heated to 78° C. and 1.39 pounds of calcium hydroxide was added. The mixture was reacted under mild agitation for 12 hours at 78° C., during which time the alkalinity decreased from pH 9.2 to pH 8.6. The essentially inorganic undissolved solids were then removed from the mixture and the reaction product was then dried and ground to powder to produce the drilling mud additive.

A test drilling mud was prepared by mixing together 335 ml. water, 15 grams of a natural clay having a yield value of 35 barrels of 15 centipoise mud per ton of clay, 15 grams bentonite and 50 grams Texas clay and stirring with high speed stirrer (15000 r.p.m.) for five minutes. To convert to a limed mud, there was added 10 grams of calcium hydroxide, 8 ml. sodium hydroxide solution (1.00 ml.=0.25 gram NaOH) and 5 grams of the lignosulfonate additive material prepared as described above, and mixed for 2 minutes.

The effectiveness of the reaction used to prepare the additive is demonstrated for a mixture of the limed mud with 10% by weight of diesel oil, by evaluating the viscosity, gels and water loss determined by American Petroleum Institute methods. The comparative results for the effect of adding the unreacted sulfonated lignin containing material and the reaction product of our alkaline treatment to 10% diesel oil emulsions are given in the following tabulation:

*Table 1*

EFFECT OF ALKALINE TREATMENT ON THINNING OF OIL EMULSION MUD

| Sample | #/bbl. | 10% diesel emulsion | | | |
|---|---|---|---|---|---|
| | | I.G. | Visc. | 10 G. | W.L. |
| Conc. and ferm. sulfite liquor solids (untreated) | 5 | 50 | 42 | 220 | 10.0 |
| Sulfonated lignin containing reaction product | 5 | 20 | 30.2 | 190 | 9.3 |

Note.—I.G.=Initial gel; Visc.=Viscosity; 10 G.=10 min. gel; W.L.=water loss.

In carrying out these experiments, we have found particularly valuable the book entitled, "The Principles of Drilling Mud Control," 8th Edition under date of 1951, published by the Industrial and Business Training Bureau, Division of Extension, University of Texas, Austin, Texas, and in cooperation with the American Association of Oilwell Drilling Contractors. This booklet sets forth the various ways in which tests can be carried out on drilling muds for the evaluation of the muds and the additives thereto. The tests which we have followed for use are those described on pages 8 to 11 and these tests are commonly used at the present time to evaluate products in this industry. These tests are given in more detail in the "Recommended Practice for Standard Field Procedure for Testing Drilling Fluids," published by the American Petroleum Institute, Division of Production, Dallas, Texas.

The terms clay, natural clay, or natural Texas clay are names used in the drilling mud industry referring to the type of clays used for drilling mud purposes, it being understood that a Texas clay refers to a clay mined in Texas for the drilling mud industry. Clay, to qualify as suitable material to form a drilling mud, depends upon what is called its "yield value." This value is the number of barrels of 15 centipoises mud which can be made from a ton of clay along with water. The natural Texas clay has a yield value of 35 barrels of 15 centipoises mud per ton. Bentonite clay is characterized by a yield value of about 90 barrels of 15 centipoises mud per ton.

H. A. Ambrose, Ph. D. and A. G. Loomis, Ph. D. state regarding drilling mud clays:

"Analysis tells us little with respect to the properties required in drilling. There has been no correlation between chemical analysis of clays and their suitability for drilling purposes." (The Science of Petroleum, vol. 1, page 458—1938, Oxford University Press (London).)

EXAMPLE III

In considering the results and data of the tabulations, it is very important to recognize the influence of the presence of caustic soda on the results of tests conducted. Common practice in the field involves the use of caustic soda in testing the drilling muds for their effectiveness and, therefore, the following results of Table 2 are of particular importance in testing the reaction product additive of our discovery and process:

Thus, in Table 2, we show the results obtained by use of concentrated and fermented calcium base spent sulfite liquor solids to the extent of 5 pounds per barrel in a limed mud where caustic soda is not used, and it is to be noted that a very high initial gel is obtained and indeed the mixture turned out to be essentially too thick to test. On the other hand, with precisely the same materials except with an amount of caustic soda added consisting of 2 pounds of said caustic per barrel, it is notable that a completely different behavior is obtained, in that a much more fluid material is obtained and thus the important influence of adding caustic is demonstrated. Thus the data given in Table 2 shows that if the tests are to be significant or of value, the test must include the requirement that the mud have caustic soda added. Such addition of caustic to the mud is common practice, see page 36 of the booklet entitled, "The Principles of Drilling Mud Control," where a description is given of the conversion of a sodium base mud to a lime base mud, including the addition of sodium hydroxide as well as calcium hydroxide. Thus, caustic soda must be added in order to have the test made in accordance with standard methods, i.e. common test practice, in the field. Accordingly, all of our tests have been carried out by the standard method described above and using definite additions of caustic as significant field tests require. In short, we disclose the improved character of the additive product of our invention and discovery by subjecting said product to established and recognized tests.

The improvements developed by our process result from chemical reactions which proceed under critical conditions of alkalinity and temperature, as well as time of reaction. If the alkalinity is low the reaction proceeds very slowly or not at all. The reaction proceeds more rapidly as the temperature is increased and reactions which proceed slowly if at all at one temperature proceed more rapidly at a higher temperature. In our process, therefore, the degree of alkalinity or pH is limited both during reaction and finally so that no substantial further reaction occurs. Of course, the basic reagent is to a degree consumed by the reaction so that the initial alkalinity will be somewhat higher than the final alkalinity unless there is some make-up of the basic reagent. Also, the temperature must be sufficiently high to preclude the processing time being unreasonably long.

Having now given examples of the procedure for the preparation of a sulfonated lignin containing reaction product and use thereof as an additive in drilling muds, we shall now proceed to show how our process differs from and has advantages over earlier processes. The use of sulfonated lignin containing material from spent sulfite liquor or its concentrated and/or fermented derivatives without further treatment, has been proposed previously. Therefore, we have carried out experiments to show how results obtained with such sulfonated lignin containing material, alkanized by our process, differ from results obtained when such material is untreated.

EXAMPLE IV

Table 3 sets forth data relating to tests on four samples which compare the characteristics or properties of un-

*Table 2*

EFFECT OF ADDITION OF SODIUM HYDROXIDE ON THINNING OF LIMED MUDS CONTAINING SULFITE LIQUOR SOLIDS

| NaOH (#/bbl.) | Conc. and ferm. sulfite liquor solids (#/bbl.) | Limed mud | | | | 10% I.G. | Diesel emulsion | | |
|---|---|---|---|---|---|---|---|---|---|
| | | I.G. | Visc. | 10 G. | W.L. | | Visc. | 10 G. | W.L. |
| 0 | 5 | 150 | (1) | (1) | (1) | (1) | (1) | (1) | (1) |
| 2 | 5 | 10 | 15.0 | 90 | 18.5 | 45 | 30.2 | 180 | 11.5 |

1 Too thick to measure.
Note.—I.G.=Initial gel; W.L.=Water loss; Visc.=Viscosity; 10 G.=10 minute gel.

treated sulfonated lignin containing material (sample 1), the alkanized reaction product of our invention and discovery (samples 2 and 3), and a reaction and product of increased alkalinity (sample 4), such data showing the effect of a progressive increase in final pH value, as follows:

proceeded in a different degree of alkalinity. Thus, what is given in Table 3 for samples 2, 3 and 4 is the final degree of alkalinity, which was respectively, pH 7.9, pH 8.6 and pH 11.3. Results of the tests show that the pH at which the reaction proceeds does have an important and unexpected influence. Thus, if reac-

*Table 3*

EFFECT OF DEGREE OF ALKALINITY ON MUD THINNER PROPERTIES

[Test procedure as in Example II]

| Sample | Time, hrs. | Temp., °C. | NaOH added lb./ton | #/bbl. | Limed mud | | | | 10% diesel emulsion | | | |
|---|---|---|---|---|---|---|---|---|---|---|---|---|
| | | | | | I.G. | Visc. | 10 G. | W.L. | I.G. | Visc. | 10 G. | W.L. |
| 1. Conc. and ferm. SSL solids (untreated) | | | 0 | 5 | 2 | 14.8 | 80 | 17.8 | 50 | 42 | 220 | 10.0 |
| | | | | 7 | 0 | 11.0 | 20 | 17.8 | 0 | 22.5 | 100 | 10.0 |
| 2. Same, alkalinized at pH 7.9 | 24 | 95 | 140 | 5 | 0 | 12.5 | 50 | 15.6 | 15 | 30.3 | 170 | 9.0 |
| | | | | 7 | 0 | 9.8 | 2 | 15.4 | 0 | 18.7 | 25 | 8.3 |
| 3. Same, alkalinized at pH 9.2 | 24 | 95 | 165 | 5 | 0 | 16.2 | 70 | 14.2 | 10 | 33.0 | 180 | 8.5 |
| | | | | 7 | 0 | 9.8 | 5 | 14.3 | 0 | 20.0 | 40 | 7.5 |
| 4. Same, alkalinized at pH 11.3 | 4 | 95 | 280 | 5 | 75 | 25.0 | 250 | 16.2 | (¹) | (¹) | (¹) | (¹) |
| | | | | 7 | 5 | 14.8 | 120 | 16.5 | 45 | 33.0 | 230 | 9.3 |

¹ Too thick to measure.

NOTE.—I.G.=Initial gel; Visc.=Viscosity; 10 G.=10 min. gel; W.L.=Water loss.

In Table 3, data is given for sample 1, which consists of a calcium base spent sulfite liquor, evaporated to powder form after removal of the fermentable sugars by fermentation. The tests obtained on this product are those from essentially untreated spent sulfite liquor solids, except that the proportion of sulfonated lignin in the solids has been increased somewhat as a result of the partial removal of sugars. Our process consists of permitting the fermented sulfite spent liquor to undergo reaction in an alkaline solution created by use of sodium hydroxide under such condition that the alkalinity is maintained during the reaction in the range of about pH 7 to about pH 10 and preferably about pH 7.5 to about pH 9.5. This degree of alkalinity can be achieved with some sulfonated lignin containing liquors by adding about 9 pounds of anhydrous caustic soda or of hydrated lime per 100 pounds of spent sulfits liquor solids. ("Some" is used before "sulfonated lignin containing liquors" because the acidity of a given liquor is dependent upon the conditions used in the cooking of the pulp. This varies not only between different plants, but even in the same plant. Therefore, a preliminary test should be made to determine the optimum quantity and concentration of sodium hydroxide most advantageous in a specific instance.) Reaction within the range of about pH 7 to about pH 10 can be permitted to continue for a period up to 1 or 2 weeks, adding more caustic if necessary, but of course, the time required to carry out the reaction will depend upon the temperature and pH at which the reaction is conducted. We prefer to conduct the reaction at about the temperature at which the sulfonated lignin containing liquor comes from an evaporator or at a temperature of about 80° C., and under these conditions the time required for such reaction has been found to be only about 3 hours.

The results given in Table 3 show how the character of the material changes as reaction proceeds under alkaline conditions. Thus, Table 3 sets forth the behavior for sample 1 with the mud made and tested under standard conditions using as an additive the solids from fermented and concentrated spent sulfite liquor which is the preferred starting material for our reaction. Samples 2 and 3 show results of standard tests on drilling muds to which have been added 5 or 7 pounds per barrel of the additive of our invention prepared in two different ways. Sample 4 was reacted under conditions of stronger alkalinity for comparison. For each of these latter three (samples 2, 3 and 4) cases the reaction was carried out for the same time, which was three hours, and at a temperature of 80° C., but different amounts of alkali were added so that in each case the reaction tion is carried out under the proper conditions, namely, those for samples 2 or 3 at an alkalinity so that the final pH is between the preferred limits of pH 7.5 to pH 9.0, the solids have particularly valuable characteristics as drilling mud additives, i.e., desirable low values for viscosity, gels and water loss are obtained, while for treatments at higher pH values of the order of pH 11.3 (sample 4), the viscosity, gels and water loss are substantially higher, and indeed, with the 10% diesel emulsion, the dispersion became even too thick to measure.

The results of the tests given in Table 3, and particularly for sample 4, are especially important to distinguish our product from the previously described precipitated sulfite waste liquor material resulting from application of Howard's process (Reissue Patent No. 18,268) which process was employed as a part of a process disclosed by Barnes (U.S. Patent No. 2,491,436). The precipitated material of Howard is obtained by adding lime to waste sulfite liquor whereby a strongly alkaline condition is achieved and precipitation takes place. It is now generally recognized that the lime precipitate represents only about 60% of the total solids in the original spent sulfite liquor. Thus, to make a satisfactory drilling mud additive, such prior disclosure of Barnes found it necessary to remove some 40% of the original sulfonated lignin. On the other hand, with our process, all of the solids in fermented and concentrated spent sulfite liquor are converted to valuable drilling mud additive materials by the reaction which proceeds during the carrying out of our process.

EXAMPLE V

The data presented in the following Table 4 shows the effect of the time of alkaline treatment of fermented and concentrated spent sulfite liquor on the properties of this material when used as a thinner in lime-base drilling mud. The mud used in these experiments was prepared as outlined in Example I using the following proportions: 335 ml. of water, 15 g. Wyoming bentonite, 15 g. of a natural clay having a yield value of 30, 50 g. of the natural clay having a yield value of 20 and mixing for five minutes in a high speed mixer (15,000 r.p.m.). The drilling mud was then "broken over," to employ the term used in practice to denote the procedure of adding an additive to reduce the viscosity of the drilling mud to a satisfactory level, as described in Example I, using 10 g. of lime, 8 ml. of caustic soda solution containing 2 g. of sodium hydroxide, and the number of grams of additive is equal numerically to the pounds of additive per barrel of mud desired in the mix, the whole batch being mixed for five minutes with a high speed stirrer. This mix is then rolled overnight in a closed jar, then mixed five minutes on a high speed mixer and tested as outlined under Example I.

*Table 4*

EFFECT OF TIME ON RESULTS OF ALKALINE TREATMENT

| Sample | pH | Lb./bbl. | Initial gel | Viscosity | 10 min. gel | Water loss |
|---|---|---|---|---|---|---|
| Conc. and ferm. SSL solids (untreated). | ---- | 4 | 65 | 25.0 | 195 | 19.1 |
|  | 4.3 | 6 | 0 | 13.0 | 60 | 18.2 |
| 21 hours | 9.25 | 4 | 30 | 25.0 | 120 | 14.8 |
|  |  | 6 | 0 | 12.3 | 40 | 15.0 |
| 4 days | 8.40 | 4 | 15 | 21.5 | 90 | 14.2 |
|  |  | 6 | 0 | 13.6 | 25 | 13.3 |
| 8 days | 8.10 | 4 | 8 | 18.7 | 95 | 16.0 |
|  | ---- | 6 | 0 | 12.3 | 20 | 14.2 |

The results show that the viscosity and gels generally decrease with time up to 8 days, but that under the conditions of the treatment the water loss goes through a minimum.

EXAMPLE VI

The information given in the following table (Table 5) illustrates the effect of temperature on the results of alkaline treatment. As seen in the table the viscosity, gels and water loss of muds to which the additive has been added decreases as the temperature is increased up to 100° C. for the pH and time of treatment involved. At a treatment temperature of 120° C. for the time and pH stated, the water loss, viscosity and gels are somewhat increased. At this temperature it would have been better to have used either less basic reagent or a shorter time of treatment for optimum results.

*Table 5*

EFFECT OF TEMPERATURE ON RESULTS OF ALKALINE TREATMENT

[140 lb. NaOH per ton. Initial liquid pH 9.9. Heated 2 hr.]

| Sample | Treatment Temperature, °C. | Final pH | Limed mud tests | | | |
|---|---|---|---|---|---|---|
|  |  |  | Lb./bbl. | I.G. | Visc. | 10 G. | W.L. |
| 1 | 32 | (¹) | 4 | 90 | 21.5 | 200 | 22.2 |
|  |  |  | 6 | 5 | 15.0 | 100 | 20.9 |
| 2 | 32 | 9.70 | 4 | 140 | 40 | 170 | 20.2 |
|  |  |  | 6 | 15 | 16.0 | 120 | 19.2 |
| 3 | 60 | 9.60 | 4 | 80 | 25.0 | 220 | 19.9 |
|  |  |  | 6 | 0 | 13.0 | 80 | 17.4 |
| 4 | 100 | 8.90 | 4 | 90 | 29.0 | 220 | 18.4 |
|  |  |  | 6 | 2 | 13.5 | 90 | 17.2 |
| 5 | 120 | 8.75 | 4 | 55 | 20 | 150 | 20.3 |
|  |  |  | 6 | 5 | 14.0 | 100 | 17.2 |

¹ Untreated.

EXAMPLE VII

The test procedure used for the data presented in Table 6 was reported by Daniel and Goldman (I.E.C., Anal. Ed., vol. 18, pp. 26–31, 1946), for the relative evaluation of dispersing agents. According to this test, 20 grams of dry calcium carbonate are titrated with a solution of the dispersing agent while mixing the mass with a spatula on a glass plate. As the liquid is added to the powder slowly, the mass first forms a cake and then becomes gradually more fluid. The character of the mass is observed closely and the number of cc. required to come to three distinct physical conditions or states are recorded. These physical states are described as: Wet point—the calcium carbonate first forms a definite cake. Flow point—the mass for the first time will flow off a spatula when the handle is tapped. Thread point—the material flows from the spatula in long strings when tapped.

Information observed for untreated fermented and concentrated sulfite liquor solids and alkalinized reaction product solids (in 3% solution) according to our process are given in the following table:

*Table 6*

EVALUATION OF DISPERSING POWER OF ALKALINIZED REACTION PRODUCT

| Sample | Water | (2%) Calgon [1] | Untreated ferm. and conc. sulfite liquor solids | Alkaline treated [2] reaction product |
|---|---|---|---|---|
| Wet point (ml.) | 12.7 | 10.8 | 10.9 | 10.2 |
| Flow point (ml.) | 32 | 13.7 | 13.4 | 11.5 |
| Thread point (ml.) | None | 16.5 | 14.3 | 13.3 |

[1] Sodium hexametaphosphate.
[2] 140 lb. of NaOH per ton of starting material (solids obtained by fermentation and concentration of spent sulfite liquor), reacted for 2 hours at 100° C. Final pH 9.1.

Considering generally the nature of reaction products obtained by our process, it has been determined that at least the treated sulfonated lignin component is different from the sulfonated lignin component of the starting materials, as revealed by the ultraviolet absorption of water solutions of these materials since the ultraviolet absorption is known to depend on the molecular arrangement in organic compounds. Thus, the reaction products are concluded to be different in view of the fact that analysis by the ultraviolet absorption spectrum technique shows definite change in the sulfonated lignin molecular structure.

EXAMPLE VIII

*Alkaline treatment of sulfonated lignin containing material with barium hydroxide*

An alkaline treatment of sulfonated lignin containing starting material (spent sulfite liquor fermented and concentrated) with barium hydroxide at pH 8 was made to illustrate the improved drilling mud thinner properties obtained by the reaction treatment of our process. Comparative tests of the treated reaction product with the unreacted solids (untreated solids from fermented spent sulfite liquor) show that lower gels and water loss can be obtained in drilling mud with the treated reaction product. Results are presented in Table 7.

The alkaline treatment was made by digesting 200 grams of fermented and vacuum evaporated spent sulfite liquor containing 50% by weight of non-volatile solids at 80° C. to 95° C. for 20 hours while adding barium hydroxide in a water slurry form as the basic reagent periodically to maintain the pH at 8. Nineteen grams of barium hydroxide were added to 100 g. of spent sulfite liquor solids during the treatment to obtain a final product with pH 8.0. The product liquor was dried at 60° C. without clarifying. Clarifying would give some further improvement. In other words the improvement is somewhat masked by the large amount of $Ba(OH)_2$ added.

The drilling mud thinning properties of the reaction product solids were compared with those of a dried sample of the indicated starting material by the test method earlier described. The mud used contained 40 g. of a commercial drilling clay having a yield value of 45 barrels of 15 cps. mud per ton of clay, 6.5 g. of a commercial drilling clay having a yield value of 95 barrels of 15 cps. mud per ton of clay, 0.259 g. sodium chloride and 0.59 g. calcium carbonate in 350 ml. of water.

*Table 7*

ALKALINE TREATMENT WITH BARIUM HYDROXIDE

| Sample | Lb./bbl. | Rolled overnight at room temp. | | | |
|---|---|---|---|---|---|
|  |  | I.G. | Y | 10 G. | W.L. |
| Untreated ferm. and conc. spent sulfite liquor solids. | 4.0 | 15.0 | 11.0 | 72.0 | 15.8 |
|  | 6.0 | 2.0 | 7.0 | 39.0 | 15.9 |
| Ba(OH)₂ treated reaction product solids. | 4.0 | 12.5 | 10.0 | 56.0 | 13.6 |
|  | 6.0 | 1.0 | 7.0 | 31.5 | 13.0 |

The improved properties of the alkalinized reaction product obtained when using barium hydroxide as the basic reagent in practice of our process are significant in demonstrating that the basic reagent can be an only slightly water soluble alkaline earth metal hydroxide as well as a more soluble alkali metal hydroxide. It will be apparent and readiy understood that Ba(OH)$_2$ is representative of and demonstrates the operability of all the alkaline earth metal hydroxides for purposes of our reaction process because its water solubility is generally of the same order as that of the other alkaline earth metal hydroxides, namely Ca(OH)$_2$, Sr(OH)$_2$ and Mg(OH)$_2$.

EXAMPLE IX

*Sulfonated lignin containing material, effect of fermentation pretreatment on subsequent alkaline reaction*

Samples of unfermented and fermented spent sulfite liquor solids were treated by adding sodium hydroxide in the amount of 8% by weight of the non-volatile sulfite liquor solids and heated for 24 hours at 95° C. and then dried and tested as drilling mud thinners. The pH immediately after adding sodium hydroxide was approximately 10.0 and decreased rapidly initially. After 24 hours at 90° C. the pH of the fermented spent sulfite liquor had dropped to 8.0 and the pH of the unfermented sulfite spent liquor to 7.0. The treated samples were dried at 60° C. A sample of the unfermented spent sulfite liquor was neutralized to pH 4.0 with sodium hydroxide and a sample of fermented spent sulfite liquor having a pH of 4.5 was also dried at 60° C. for comparison.

The dried samples were tested as thinners in a lime base drilling fluid prepared from a commercial drilling clay having a yield value of approximately 45 barrels of 15 centipoises mud per ton of clay. The fluid was prepared by mixing 60 g. of clay with 325 g. of water for 15 minutes with a high speed mixer and aging the resulting mud for 24 hours at room temperature. The mud was then converted to a drilling fluid and thinned by adding 6 g. of lime, 1.5 g. sodium hydroxide, and 6 g. of one of the dried samples and mixing for 5 minutes with a high speed mixer, and tested immediately for initial gel strength and plastic viscosity.

The test results (see Table 8) show that the alkalinized samples produced lower gels and A.P.I. filter loss than the untreated samples and that the alkaline treated fermented liquor solids produced the lowest gels and yield value.

*Table 8*

| Sample | Initial gel (lb./100 ft.²) | Plastic viscosity (cp.) | Yield value (lb./100 ft.²) | 10 min. gel (lb./100 ft.²) | A.P.I. filter loss (ml.) |
|---|---|---|---|---|---|
| Unfermented SSL (untreated) | 8.0 | 8.0 | 8.0 | 78.0 | 18.4 |
| Alkalinized unfermented SSL | 6.0 | 7.5 | 8.5 | 69.0 | 12.8 |
| Fermented SSL (untreated) | 17.0 | 7.0 | 8.0 | 49.0 | 15.2 |
| Alkalinized fermented SSL | 4.5 | 8.5 | 7.0 | 52.0 | 14.1 |

EXAMPLE X

To illustrate the improvement in drilling mud thinner properties produced by the reaction treatment of our process, as applied to the various earlier enumerated types of sulfonated lignin containing starting materials obtained extractively from an acid bisulfite pulping process, the following tests were conducted.

Table 9 further illustrates the effect of the nature of the starting material on the results of alkaline treatment. A sample of fermented, dilute spent sulfite liquor having a non-volatile solids content of 10% by weight and a sample of unfermented, dilute spent sulfite liquor having a non-volatile total solids content of 10% by weight were subjected to alkaline treatment with sodium hydroxide, both as dilute and concentrated liquors. Portions of each of the fermented and unfermented liquor samples were dried for test in an oven at 60° C. and reduced to a powder by grinding. Other portions were made alkaline with sodium hydroxide and heated for 20 hours at 90° C. while maintaining the alkalinity at pH 8. Still other portions were concentrated to 50% non-volatile solids by weight by evaporating over a boiling water bath and then made alkaline with sodium hydroxide and heated for 20 hours at 90° C. while maintaining the alkalinity at pH 8. The alkalinized reaction products were dried at 60° C. and reduced to a powder by grinding. The percentage of sodium hydroxide used in each instance and the pH of the final products are presented in Table 9.

A drilling mud was prepared and mud tests were made up for test as earlier described. After rolling overnight at room temperature the mud test samples were rolled 20 hours in sealed bottles at 150° F., were cooled, then mixed 5 minutes on a high speed mixer and then tested for initial gel, viscosity, 10 minute gel and water loss. The tests were made with 4 pounds per barrel of additive.

*Table 9*

EFFECT OF NATURE OF STARTING MATERIAL ON RESULTS OF ALKALINE TREATMENT

| Starting material (dried for test) | NaOH used (percent of solids) | pH after treatment | Mud test results at 4#/bbl. thinner | | | |
|---|---|---|---|---|---|---|
| | | | I.G. | Visc. | 10 G. | W.L. |
| Dilute unfermented SSL (10% solids) | (¹) | 4.0 | 4.0 | 20.5 | 40.0 | 16.6 |
| Dilute unfermented (10% solids) ² | 9.5 | 7.9 | 4.0 | 20.0 | 48.0 | 13.5 |
| Concentrated unfermented (50% solids) | 8.0 | 8.1 | 3.0 | 16.5 | 30.0 | 13.7 |
| Dilute fermented SSL (10% solids) | (¹) | 4.0 | 4.0 | 20.5 | 38.0 | 15.0 |
| Dilute fermented (10% solids) ² | 8.0 | 7.8 | 11.0 | 21.5 | 52.0 | 14.0 |
| Concentrated fermented (50% solids) | 7.0 | 7.8 | 2.5 | 18.0 | 30.0 | 14.2 |

¹ No treatment.
² When alkali is added before concentration more NaOH is required to give the pH because volatile acids (organic and SO$_2$ etc.) are removed by concentration. Thus the sodium salts would be present in the neutralized concentrated liquor. Such salts are known to affect the properties of clay slurries and account for the difference in degree of improvement in the properties of the test muds. This is confirmed by the fact that the alkaline treatment is even more effective when the volatile components are more thoroughly removed in the concentration phase, as by high temperature as distinguished from vacuum evaporation, the high temperature promoting disassociation of the dissolved and loosely combined SO$_2$ with the spent sulfite liquor solids.

The data in Table 9 show the improved thinning and water loss resulting from the alkaline treatment of our process. The data show that the treatment of the dilute (10% solids) liquor lowers the water loss but does not lower viscosity and gels. With the concentrated (50% solids) liquor, viscosity and gels and water loss are lowered by the alkaline treatment. The data also show that more basic reagent is used in treating the liquor at 10% solids than at 50% solids for the same alkalinity. The alkaline treatment of concentrated liquor produces the greatest improvement in thinning and is, therefore, the preferred method of treatment. The alkaline treatment of fermented liquor requires less sodium hydroxide than the treatment of unfermented liquor because some alkali is added during the fermentation phase.

SUMMARY

Our process and the reaction product formed thereby involves reacting a sulfonated lignin containing material to alkalinize the same under particular reaction conditions. The nature of the basic reagent giving the requisite hydroxyl ion concentration and the amount thereof used are such that there is no substantial precipitation of the sulfonated lignin. A hydroxyl ion concentration of between about pH 7 and about pH 10 is established and maintained throughout the reaction. Elevated temperatures in the range of about 40° C. to about 120° C. and preferably about 70° C. to about 95° C. are employed, and the reaction is continued to substantial completion, i.e. until substantially no further drop in hydroxyl ion concentration occurs.

The sulfonated lignin containing starting material for our process is obtained from spent sulfite liquor, in turn the extractive by-product from a bisulfite pulping process, the spent sulfite liquor being employed either directly or with modification pretreatment such as fermentation and/or concentration, both fermentation and concentration pretreatment being given the preferred form of starting material.

The requisite basic reagent for alkalinization of such sulfonated lignin containing material by our process is selected from the group consisting of alkali and alkaline earth metal hydroxides and alkali and alkaline earth metal salts having sufficient solubility and predominant hydroxyl ion concentration in aqueous solution to provide a hydroxyl ion concentration of at least about pH 10 and of a character as to not precipitate substantially any of the lignin within the range of about pH 7 to about pH 10, the preferred basic reagents being sodium hydroxide and calcium hydroxide.

The alkalinized reaction product can be used in solution form but is preferably reduced to dryness and a powder form for ease and economy of handling. The reaction product solution can be evaporated to dryness to a solid form and ground to a fine powder, or the solution can be spray dried. The commercially preferred method of drying is spray drying, since this technique has the advantage of not requiring grinding and produces powder of extremely fine particle size.

It is to be emphasized that alkalinization of the sulfonated lignin containing material by our process involves no substantial precipitation of the sulfonated lignin during the reaction. As such, our process differs basically from prior practices which have employed calcium hydroxide (usually added as calcium oxide) in excess to precipitate most of the sulfonated lignin. Such precipitation of sulfonated lignin involves expensive withdrawal of the precipitate in stages, and the test data set forth show that when precipitated lignin is employed as a drilling mud additive the greater alkalinity has an injurious effect on the desired properties of the drilling mud (see sample 4 in Table 3 above, for example). Further, it is much more economical to perform chemical processing in solution by a continuous treatment than to deal with solids in a batch treatment operation, the latter of course requiring periodic filtration or separation.

A further commercially important economy in favor of our process is the relatively small amount of basic reagent required, in that our process by its very nature uses only a small amount of basic reagent as a more alkaline reaction condition has a deleterious effect (again noting sample 4 in Table 3 above).

This application is a continuation-in-part of our copending application Ser. No. 391,116, filed November 9, 1953, now abandoned and entitled "Treated Spent Sulfite Liquor Additive."

What is claimed is:

1. A drilling mud composition comprising an alkaline earth metal clay dispersed in water with more than about 1 lb./bbl. of an additive composed of an alkalinized sulfonated lignin containing material having been prepared by a process comprising reacting spent sulfite liquor which is composed essentially of all of the ligno-sulfonate solids of said liquor, with sodium hydroxide in aqueous solution in sufficient amount to establish and maintain hydrogen ion concentration of the reaction within the range of about pH 7 to about pH 13 without substantial precipitation of any of the sulfonated lignin, and maintaining the solution at an elevated temperature until the reaction proceeds substantially to completion.

2. The drilling mud composition of claim 1, wherein the spent sulfite liquor is concentrated to a concentration of solids of about 50 percent by weight.

3. The drilling mud composition of claim 1, wherein the alkalinized reaction product is reduced to powder form by drying.

4. The drilling mud composition of claim 1, wherein the temperature of the reaction is maintained within the range of about 70° C. to about 95° C.

5. The drilling mud composition of claim 1, wherein the hydrogen ion concentration of the reaction is established and maintained within the range of about pH 7.5 to about pH 9.

6. A drilling mud composition comprising an alkaline earth metal clay dispersed in water with more than about 1 lb./bbl. of an additive composed of an alkalinized sulfonated lignin containing material, said alkalinized sulfonated lignin containing material having been prepared by a process comprising reacting a sulfonated lignin containing material obtained by fermentation and at least partial concentration modification of a spent sulfite liquor from a bisulfite pulping process, and comprising essentially all of the lignosulfonate solids of said liquor, with a basic reagent selected from the group consisting of alkali and alkaline earth metal hydroxides and alkali and alkaline earth metal salts and mixtures thereof, said basic reagent having sufficient solubility and hydrogen ion concentration in aqueous solution to provide a pH of at least about pH 10, a sufficient amount of such basic reagent being used to establish and maintain the hydrogen ion concentration of the reaction within the range of about pH 7 to about pH 10 without precipitation of the contained lignosulfonate, maintaining the temperature of the reaction within the range of about 40° C. to about 120° C., continuing the reaction until substantially no further drop in pH occurs.

7. A drilling mud composition comprising an alkaline earth metal clay dispersed in water with more than about 1 lb./bbl. of additive composed of an alkalinized sulfonated lignin, said alkalinized sulfonated lignin having been prepared by the process comprising reacting sulfonated lignin containing material derived from wood pulping liquors composed essentially of all of the lignosulfonate solids of said liquor with a basic reagent selected from the group consisting of alkali and alkaline earth metal hydroxides and alkali and alkaline earth metal salts and mixtures thereof in aqueous solution, said basic reagent having sufficient solubility and hydroxyl ion concentration in aqueous solution to provide a pH of at least about pH 10, said basic reagent being added in sufficient amount to establish and maintain the hydroxyl ion concentration of the reaction within the range of about pH 7 to about pH 13 without substantial precipitation of the sulfonated lignin, and maintaining the solution at an elevated temperature until the reaction proceeds substantially to completion.

8. A drilling mud composition comprising an alkaline earth metal clay dispersed in water with more than about 1 lb./bbl. of additive composed mainly of an alkalinized sulfonated lignin, said alkaline sulfonated lignin having been prepared by a process comprising reacting sulfonated lignin containing material derived from spent sulfite liquor composed essentially of all the lignosulfonate solids of said liquor with a basic reagent selected from the group consisting of alkali and alkaline earth metal hydroxide and alkali and alkaline earth metal salts and mixtures thereof, said basic reagent having sufficient solubility and hydroxyl ion concentration in aqueous solution to provide a pH of at least about pH 10, said basic reagent being added in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing reaction until substantially no further drop in hydroxyl ion concentration occurs.

9. A drilling mud composition comprising an alkaline earth metal clay dispersed in water with more than about 1 lb./bbl. of additive composed mainly of an alkalinized sulfonated lignin, said alkalinized sulfonated lignin having been prepared by a process comprising reacting spent sulfite liquor composed essentialy of all the lignosulfonate solids of said liquor with lime in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

10. A drilling mud composition comprising an alkaline earth metal clay dispersed in water with more than about 1 lb./bbl. of additive composed mainly of an alkalinized sulfonated lignin, said alkalinized sulfonated lignin having been prepared by a process comprising reacting spent sulfite liquor composed essentially of all the lignosulfonate solids of said liquor concentrated to less than 70% solids by weight with a basic reagent, selected from the group consisting of alkali and alkaline earth metal hydroxides and alkali and alkaline earth metal salts and mixtures thereof, said basic reagent having sufficient solubility and hydroxyl ion concentration in aqueous solution to provide a pH of at least about pH 10, said basic reagent being added in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

11. A drilling mud composition comprising an alkaline earth metal clay dispersed in water with more than about 1 lb./bbl. of additive composed mainly of an alkalinized sulfonated lignin, said alkalinized sulfonated lignin having been prepared by a process comprising reacting spent sulfite liquor composed essentially of all the lignosulfonate solids of said liquor concentrated to less than 70% solids by weight with sodium hydroxide in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

12. A drilling mud composition comprising an alkaline earth metal clay dispersed in water with more than about 1 lb./bbl. of additive composed mainly of an alkalinized sulfonated lignin, said alkalinized sulfonated lignin having been prepared by a process comprising reacting fermented spent sulfite liquor composed essentially of all the lignosulfonate solids of said liquor with a basic reagent, selected from the group consisting of alkali and alkaline earth metal hydroxides and alkali and alkaline earth metal salts and mixtures thereof, said basic reagent having sufficient solubility and hydroxyl ion concentration in aqueous solution to provide a pH of at least about pH 10, said basic reagent being added in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

13. A drilling mud composition comprising an alkaline earth metal clay dispersed in water with more than about 1 lb./bbl. of additive composed mainly of an alkalinized sulfonated lignin, said alkalinized sulfonated lignin having been prepared by a process comprising reacting fermented spent sulfite liquor composed essentially of all the lignosulfonate solids of said liquor with soda lime in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

14. A drilling mud composition comprising an alkaline earth metal clay dispersed in water with more than about 1 lb./bbl. of additive composed mainly of an alkalinized sulfonated lignin, said alkalinized sulfonated lignin having been prepared by a process comprising reacting fermented spent sulfite liquor composed essentially of all the lignosulfonate solids of said liquor with lime in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

15. A drilling mud composition comprising an alkaline earth metal clay dispersed in water with more than about 1 lb./bbl. of additive composed mainly of an alkalinized sulfonated lignin, said alkalinized sulfonated lignin having been prepared by a process comprising reacting chemically unmodified sulfonated lignin derived from spent sulfite liquor composed essentially of all the lignosulfonate solids of said liquor and substantially free of carbohydrates with a basic reagent, selected from the group consisting of alkali and alkaline earth metal hydroxides and alkali and alkaline earth metal salts and mixtures thereof, said basic reagent having sufficient solubility and hydroxyl ion concentration in aqueous solution to provide a hydroxyl ion concentration of at least about pH 10, said basic reagent being added in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

16. The drilling mud composition of claim 12, wherein the fermented spent sulfite liquor is concentrated to a concentration of solids of about 50% by weight.

17. A drilling mud composition comprising an alkaline earth metal clay dispersed in water with more than about 1 lb./bbl. of an additive composed of an alkalinized sulfonated lignin containing material, said alkalinized sulfonated lignin containing material having been prepared by a process comprising reacting fermented spent sulfite liquor composed essentially of all the lignosulfonate solids of said liquor and concentrated to a concentration of solids of about 50% by weight, with a basic reagent selected from the group consisting of alkali and alkaline earth metal hydroxides and alkali and alkaline earth metal salts and mixtures thereof, said basic reagent having sufficient solubility and hydroxyl ion concentration in an aqueous solution to provide a pH of at least about pH 10 and said basic reagent being added in sufficient amount to establish and maintain the hydrogen ion concentration of the reaction within the range of about pH 7 to pH 10 without substantial precipitation of sulfonated lignin, maintaining the temperature of the reaction in the range of about 40° C. to about 120° C., and continuing the reaction until substantially no further drop in pH occurs.

18. The method of drilling a well comprising circulating in the well a well drilling fluid composition comprising an aqueous suspension of an alkaline earth metal clay dispersed in water with more than 1 lb./bbl. of an additive composed of an alkalinized sulfonated lignin containing material, said alkalinized sulfonated lignin containing material having been prepared by a process comprising reacting sulfonated lignin containing material derived from wood pulping liquors composed essentially of all the lignosulfonate solids of said liquor with a basic reagent selected from the group consisting of alkali and alkaline earth metal hydroxides and alkali and alkaline earth metal salts and mixtures thereof, said basic reagent having sufficient solubility and hydroxyl ion concentration in aqueous solution to provide a pH of at least about pH 10 and said basic reagent being added in sufficient amount to establish and maintain the hydrogen ion concentration of the reaction within the range of about pH 7 to about pH 10 without substantial precipitation of the sulfonated lignin, maintaining the temperature of the reaction in the range of 40°–120° C., continuing the reaction until substantially no further drop in pH occurs.

19. The method of drilling a well comprising circulating in the well a well drilling fluid composition comprising an aqueous suspension of an alkaline earth metal clay dispersed in water with more than 1 lb./bbl. of an additive composed of an alkalinized sulfonated lignin containing material, said alkalinized sulfonated lignin containing material having been prepared by a process comprising reacting sulfonated lignin containing material derived from spent sulfite liquors composed essentially of all the lignosulfonate solids of said liquors with a base reagent selected from the group consisting of alkali and alkaline earth metal hydroxides and alkali and alkaline earth metal salts and mixtures thereof, said basic reagent having sufficient solubility and hydroxyl ion concentration in aqueous solution to provide a hydrogen ion concentration of at least about pH 10, said basic reagent being added in sufficient amount to establish and maintain the hydrogen ion concentration of the reaction within the range of about pH 7 to about pH 10 without substantial precipitation of the sulfonated lignin, maintaining the temperature of the reaction in the range of about 40° C. to about 120° C., continuing the reaction until substantially no further drop in pH occurs.

20. The process of claim 19 wherein the reaction is with fermented spent sulfite liquor.

21. The method of drilling a well comprising circulating in the well a well drilling fluid composition comprising the composition of claim 1.

22. The method of drilling a well comprising circulating in the well a well drilling fluid composition comprising the composition of claim 13.

23. The method of drilling a well comprising circulating in the well a well drilling fluid composition comprising the composition of claim 14.

References Cited in the file of this patent

UNITED STATES PATENTS

| | | |
|---|---|---|
| 1,298,477 | Drewson | Mar. 25, 1919 |
| 1,812,693 | Hailwood | June 30, 1931 |
| 2,069,185 | Hibbert et al. | Jan. 26, 1937 |
| 2,491,436 | Barnes | Dec. 13, 1949 |
| 2,491,437 | Perkins | Dec. 13, 1949 |
| 2,559,305 | Mangold et al. | Nov. 27, 1951 |